United States Patent
Robison

(10) Patent No.: US 10,174,874 B2
(45) Date of Patent: Jan. 8, 2019

(54) PIPE FITTING WITH INNER AND OUTER SEALS

(71) Applicant: Honeywell International Inc., Morris Plains, NJ (US)

(72) Inventor: David Robison, Madison, OH (US)

(73) Assignee: Honeywell International Inc, Morris Plains, NJ (US)

( * ) Notice: Subject to any disclaimer, the term of this patent is extended or adjusted under 35 U.S.C. 154(b) by 99 days.

(21) Appl. No.: 15/291,442

(22) Filed: Oct. 12, 2016

(65) Prior Publication Data

US 2018/0100612 A1 Apr. 12, 2018

(51) Int. Cl.
*F16L 37/092* (2006.01)
*F16L 33/22* (2006.01)

(52) U.S. Cl.
CPC ......... *F16L 37/092* (2013.01); *F16L 37/0925* (2013.01); *F16L 33/222* (2013.01); *Y10T 29/49826* (2015.01)

(58) Field of Classification Search
CPC ..... F16L 37/092; F16L 37/0925; F16L 47/12; F16L 33/222; Y10T 29/49826
USPC .......................... 285/105, 323, 340, 343, 371
See application file for complete search history.

(56) References Cited

U.S. PATENT DOCUMENTS

| | | | | |
|---|---|---|---|---|
| 4,106,779 A | * | 8/1978 | Zabcik | 285/351 X |
| 4,628,965 A | * | 12/1986 | Passerell | F16L 37/0925 |
| | | | | 285/105 X |
| 4,664,427 A | * | 5/1987 | Johnston | F16L 37/092 |
| | | | | 285/340 |
| 5,480,196 A | | 1/1996 | Adams, Jr. | |
| 5,547,228 A | | 8/1996 | Abbema et al. | |
| 5,551,735 A | * | 9/1996 | Takayanagi | F16L 37/0925 |
| | | | | 285/323 |
| 5,692,785 A | | 12/1997 | Wartluft et al. | |
| 5,791,698 A | | 8/1998 | Wartluft et al. | |
| 6,050,613 A | | 4/2000 | Wartluft | |
| 6,142,538 A | * | 11/2000 | Volgstadt | F16L 37/0925 |
| | | | | 285/323 |

(Continued)

FOREIGN PATENT DOCUMENTS

JP 2005-147187 6/2005
WO WO 2004/063614 A2 7/2004

(Continued)

OTHER PUBLICATIONS

Search Report dated Apr. 5, 2018 for corresponding European Appl. No. EP17184897.1.

*Primary Examiner* — Greg Binda
*Assistant Examiner* — Zachary T Dragicevich

(57) ABSTRACT

A pipe fitting configured to be coupled to a pipe, the pipe fitting including a body that is elongate along a central axis that extends in a longitudinal direction, the body including a shell, a stiffener, and a shell-stiffener. The shell includes a shell inner surface that defines a shell through hole that extends through the shell in the longitudinal direction. The stiffener is positioned within the shell through hole, and the stiffener includes a shell outer surface that faces the shell inner surface such that the stiffener outer surface and the shell inner surface cooperate to define a pocket configured to receive the pipe. The shell-stiffener seal member includes a first seal member and a second seal member aligned in a radial direction, which is perpendicular to the longitudinal direction.

12 Claims, 3 Drawing Sheets

(56) References Cited

U.S. PATENT DOCUMENTS

| | | |
|---|---|---|
| 6,286,877 B1 | 9/2001 | Mendoza et al. |
| 6,371,531 B1 * | 4/2002 | Robison .............. F16L 37/0925 |
| | | 285/105 X |
| 6,595,559 B1 | 7/2003 | Readman |
| 6,877,777 B1 | 4/2005 | Wartluft |
| 7,740,248 B2 * | 6/2010 | Keene ....................... 285/351 X |
| 7,753,413 B2 | 7/2010 | Yoshino et al. |
| 2005/0230859 A1 | 10/2005 | Hamaguchi et al. |

FOREIGN PATENT DOCUMENTS

| | | |
|---|---|---|
| WO | WO 2006/041285 A2 | 4/2006 |
| WO | 2016058914 A1 | 4/2016 |
| WO | WO 2016/058914 A1 | 4/2016 |

* cited by examiner

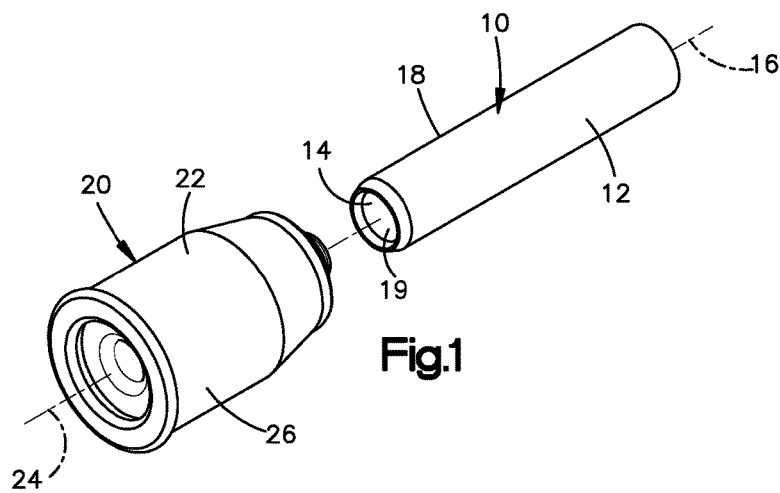
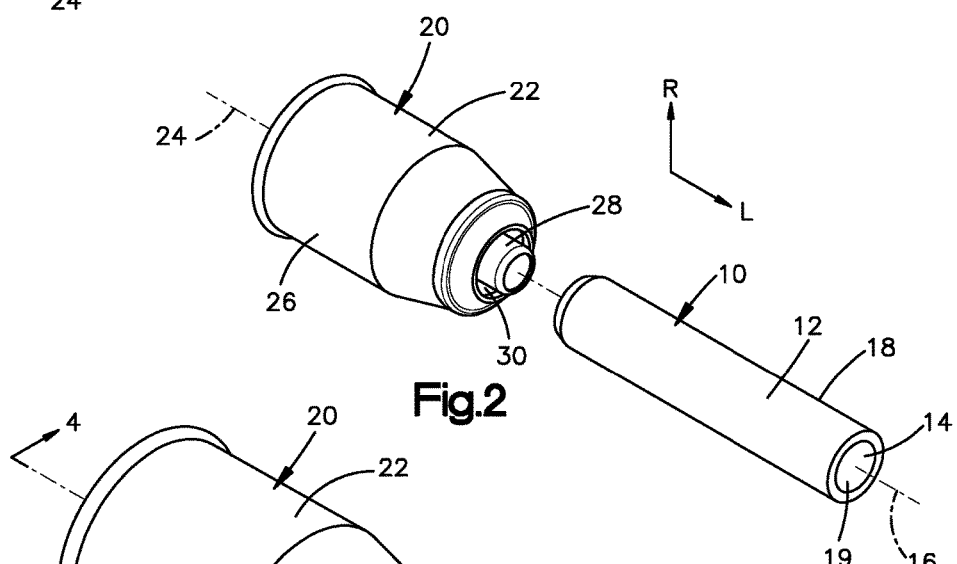
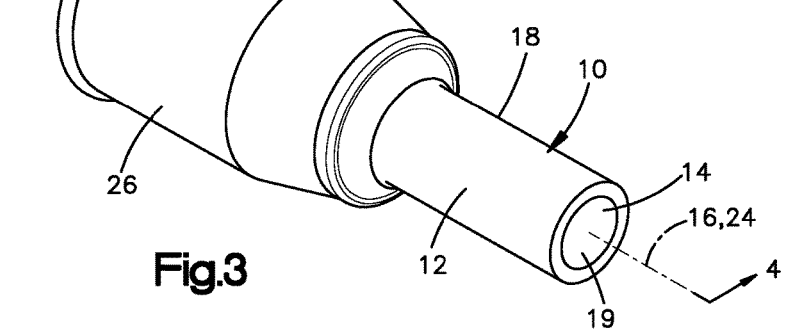

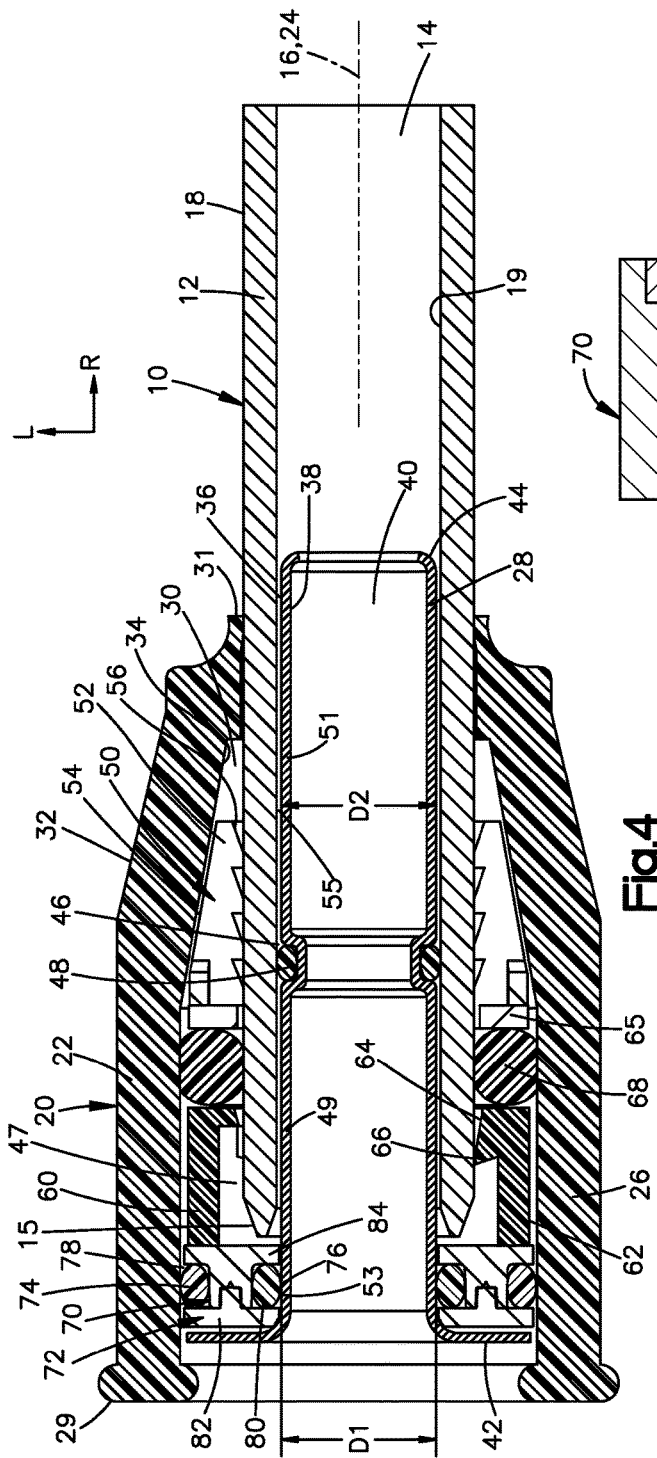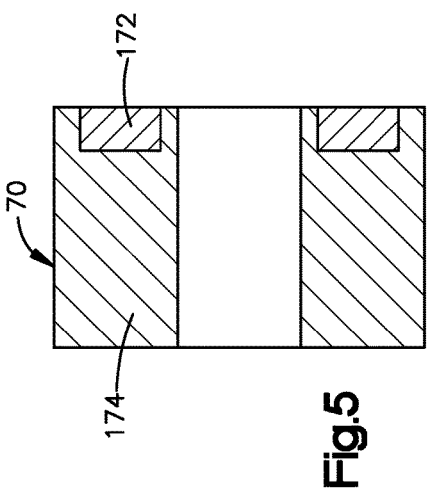

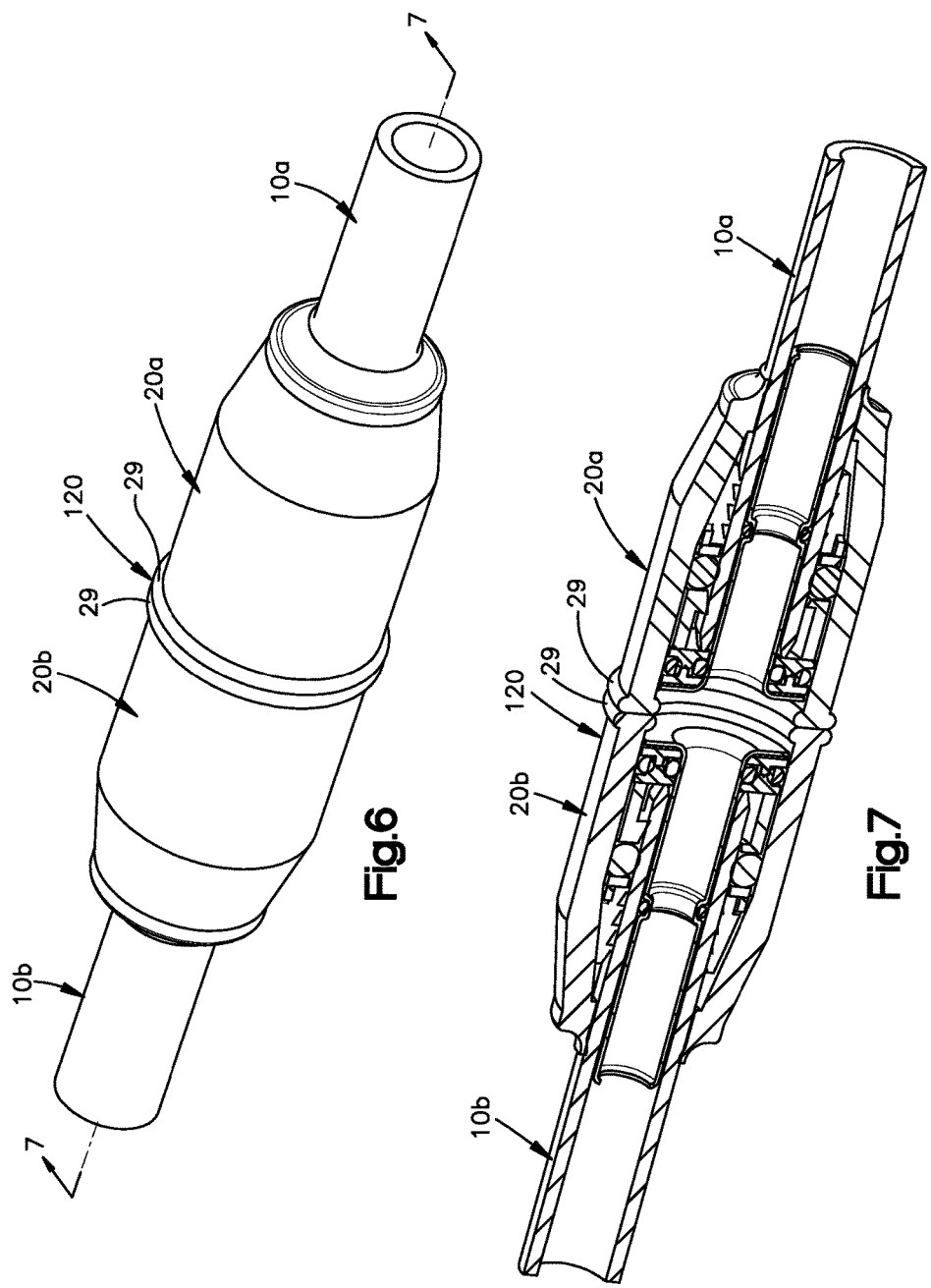

PIPE FITTING WITH INNER AND OUTER SEALS

TECHNICAL FIELD

The present application relates generally to pipe fittings. More specifically, the present application is related to stab-type pipe fittings.

BACKGROUND

Pipe fittings are used to connect sections of pipe. Stab-type fittings are a type of pipe fitting that is configured to be coupled to, for example inserted onto, an end of a pipe. One important aspect of pipe fittings is the ability to form an effective seal, for example an air tight seal, a water tight seal, or both an air and water tight seal.

Some pipe fittings include a seal member, for example an O-ring, which abuts an outer surface of the pipe and an inner surface of a portion of the pipe fitting. However, if the outer surface of the pipe is damaged, for example scratched, the seal member may not be capable of forming an effective seal with the section of the pipe.

Some pipe fittings include multiple seal members. Such a pipe fitting is described in International Publication No. 2004/063614, referred to herein as "WO 2004/063614." In WO 2004/063614 a primary O-ring simultaneously engages the outer surface of the section of pipe and the inner surface of the sleeve of the pipe fitting, and a secondary O-ring that seals an outer surface of an insert of the pipe fitting against the inner surface of the sleeve.

After installation of a pipe fitting to the section of pipe as described in WO 2004/063614, loads applied to the section of pipe may result in bending of the pipe fitting, and the bending of the pipe fitting may result in a failure of the effective seal between the pipe fitting and the section of pipe.

Thus, a pipe fitting that is capable of forming an effective seal with a section of pipe, which may have external defects, and a pipe fitting that is further capable of maintaining the effective seal in the event of loads exerted on the section of pipe and the pipe fitting is desired.

SUMMARY

In accordance with an embodiment of the disclosure, the present application discloses a pipe fitting configured to be coupled to a pipe, the pipe fitting comprising a body that is elongate along a central axis that extends in a longitudinal direction, the body including a shell and a stiffener. The shell includes a shell inner surface that defines a shell through hole that extends through the shell in the longitudinal direction. The stiffener is positioned within the shell through hole, and the stiffener includes a stiffener outer surface that faces the shell inner surface such that the stiffener outer surface and the shell inner surface cooperate to define a pocket configured to receive the pipe.

The pipe fitting further includes a shell-stiffener seal member that includes a bracket, a first seal member, and a second seal member. The shell-stiffener seal member is positioned in the pocket such that the first seal member is compressed and forms a seal between the bracket and the shell inner surface, the second seal member is compressed and forms a seal between the bracket and the stiffener outer surface, and the first seal member and the second seal member are aligned in a radial direction, which is perpendicular to the longitudinal direction.

In accordance with an aspect of the disclosure, the present application discloses a pipe fitting configured to be coupled to a pipe, the pipe fitting comprising a body that is elongate along a central axis that extends in a longitudinal direction, the body including a shell, a stiffener, and a shell-stiffener seal member. The shell includes a shell inner surface that defines a shell through hole that extends through the shell in the longitudinal direction. The stiffener is positioned within the shell through hole, and the stiffener includes a stiffener outer surface that faces the shell inner surface such that the stiffener outer surface and the shell inner surface cooperate to define a pocket configured to receive the pipe.

The stiffener outer surface defines a stiffener recess configured to receive a stiffener seal member that is configured to compress and form a seal between an inner surface of the pipe and the stiffener outer surface when the pipe is positioned in the pocket. The stiffener includes a first portion and a second portion, the second portion spaced from the first portion such that the stiffener recess is between the first portion and the second portion with respect to the longitudinal direction. The shell-stiffener seal member is compressed and forms a seal between the shell inner surface and the stiffener outer surface. The stiffener has a first outer diameter defined by the stiffener outer surface measured at a location in the first portion that is contacted by the shell-stiffener seal member, the stiffener has a second outer diameter that is defined by the stiffener outer surface measured at a location in the second portion, and the first outer diameter is equal to the second outer diameter.

In accordance with an aspect of the disclosure, the present application discloses a method of assembling a pipe fitting configured to be coupled to a pipe. The method includes the steps of: positioning a first seal member in a first partial bracket recess defined by a first portion of a bracket, positioning a second seal member in a second partial bracket recess defined by the first portion, moving a second portion of the bracket relative to the first portion until the first portion is in contact with the second portion such that both: 1) a third partial bracket recess of the second portion cooperates with the first partial bracket recess of the first portion to form a first bracket recess, and 2) a fourth partial bracket recess of the second portion cooperates with the second partial bracket recess of the first portion to form a second bracket recess, coupling the first portion to the second portion such that relative movement of the first and second portions is prevented, abutting the second seal member with a stiffener outer surface of a stiffener of the pipe fitting, and positioning the stiffener in a shell through bore defined by an inner surface of a shell of the pipe fitting such that both: 1) the shell inner surface and the stiffener outer surface cooperate to define a pocket configured to receive a pipe, and 2) the first seal member abuts the shell inner surface.

BRIEF DESCRIPTION OF THE DRAWINGS

The foregoing summary, as well as the following detailed description of illustrative embodiments of the application, will be better understood when read in conjunction with the appended drawings. For the purposes of illustrating the present disclosure, there is shown in the drawings illustrative embodiments. It should be understood, however, that the application is not limited to the specific embodiments and methods disclosed, and reference is made to the claims for that purpose. In the drawings:

FIG. 1 is a rear isometric view of a pipe fitting, according to an embodiment of the disclosure;

FIG. 2 is front isometric view of the pipe fitting illustrated in FIG. 1;

FIG. 3 is a front isometric view of the pipe fitting illustrated in FIG. 1, the pipe fitting coupled to a section of a pipe;

FIG. 4 is a side cross-section view of the pipe fitting and coupled section of the pipe illustrated in FIG. 3, along line 4-4;

FIG. 5 is a side cross-section view of a shell-stiffener seal member of the pipe fitting illustrated in FIG. 1, according to one embodiment;

FIG. 6 is a isometric view of a pipe fitting, according to another embodiment of the disclosure; and FIG. 7 is an isometric cross-section view of the pipe fitting illustrated in FIG. 6, along line 7-7.

DETAILED DESCRIPTION

Embodiments of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure. Reference herein to a first structure abutting a second structure refers to the first structure directly contacting the second structure, and precludes an intermediate structure or surface between the first structure and the second structure. The term "aligned" as used herein in reference to two elements in, along, or with respect to a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Certain features of the disclosure which are described herein in the context of separate embodiments may also be provided in combination in a single embodiment. Conversely, various features of the disclosure that are described in the context of a single embodiment may also be provided separately or in any subcombination.

Referring to FIGS. 1 to 4, a pipe 10 configured to transport a substance such as a liquid, a gas, or both through the pipe 10 includes a pipe body 12 and a pipe through bore 14 that extends through the pipe body 12. The pipe body 12 may extend along a pipe axis 16. As shown in the illustrated embodiment, the pipe axis 16 may be a central axis about which the pipe body 12 is centered. The pipe body 12 further includes a pipe outer surface 18 and a pipe inner surface 19. The pipe inner surface 19 defines the pipe through bore 14. In certain situations it may be beneficial to couple a pipe fitting 20 to the pipe 10. For example, it may be desirable to block off or cap an end of the pipe 10 such that the substance is prevented from exiting the pipe 10 and spilling into the surrounding environment. It may further be desirable to couple the pipe 10 to another pipe such that the substance is transported from the pipe 10 to the other pipe without spilling into the surrounding environment.

The pipe fitting 20 includes a body 22 that extends along a pipe fitting axis 24. As shown in the illustrated embodiment, the axis 24 may be a central axis about which the body 22 is centered. A radial or polar coordinate system is provided and described herein. The polar coordinate system includes a two dimensional radial plane that is centered on and normal to the axis 23. The polar coordinate system defines a longitudinal direction L that extends along a direction parallel to the axis 24. The polar coordinate system defines a radial direction R that extends from the axis 24 along the radial plane, such that the radial direction R is perpendicular to the longitudinal direction L. The words "inner" and "outer" designate locations closer to and farther away from the axis 24, respectively.

The body 22 includes a shell 26 and a stiffener 28 that is at least partially enclosed within a shell through hole 30 that is defined by the shell 26 such that the stiffener 28 is positioned closer to the axis 24 than the shell 26 is positioned to the axis 24 with respect to the radial direction R. The shell 26 includes a shell outer surface 32 that defines an outer perimeter of the body 22, and the shell further includes a shell inner surface 34 that defines the shell through hole 30. The shell 26 includes a shell first end 29 and a shell second end 31 that is spaced from the shell first end 29 along the longitudinal direction L. As shown in the illustrated embodiment, the shell 26 terminates along the longitudinal direction L at the shell first end 29 and the shell second end 31, and the shell through hole 30 extends through both the shell first end 29 and the shell second end 31.

The stiffener 28 includes a stiffener outer surface 36 that faces the shell inner surface 34, and the stiffener further includes a stiffener inner surface 38 that defines a stiffener through hole 40. The stiffener 28 includes a first end 42 and a second end 44 that is spaced from the first end 42 along the longitudinal direction L. As shown in the illustrated embodiment, the stiffener 28 terminates along the longitudinal direction L at the first end 42 and the second end 44, and the stiffener through hole 40 extends through both the first end 42 and the second end 44. The stiffener 28 further includes a stiffener recess 46 defined by the stiffener outer surface 36. The stiffener recess 46 is configured to receive a stiffener seal member 48, for example an O-ring. The pipe fitting 20 includes a pocket 47 positioned between and defined by the stiffener outer surface 36 and the shell inner surface 34.

The body 22 further includes a gripping assembly 50 configured to restrict, for example prevent, relative movement of the pipe 10 and the pipe fitting 20 along the longitudinal direction L once the pipe 10 and the pipe fitting 20 are coupled. The gripping assembly 50 may include a gripping collet 52, a gripping ring 60, or both poisoned within the shell through hole 30 between the shell inner surface 34 and the stiffener outer surface 36 with respect to the radial direction R. The gripping collet 52 includes a tapered outer surface 54 and a toothed inner surface 56. The gripping ring 60 includes an outer surface 62 and a toothed inner surface 64, the toothed inner surface 64 including at least one tooth 66 configured to engage the pipe outer surface 18 when the pipe fitting 20 is coupled to the pipe 10.

According to one embodiment of the disclosure the gripping assembly 50 may further include a thrust washer 65 positioned between the shell seal member 68 and the gripping collet 52 to prevent movement of the shell seal member 68 into contact with movable or flexible portions of the gripping collet 52 which may result in damage to the shell seal member 68.

The body 22 further includes a shell seal member 68 and a shell-stiffener seal member 70. The shell seal member 68 may be positioned between the gripping collet 52 and the gripping ring 60 with respect to the longitudinal direction L.

The shell seal member 68 is further positioned between the stiffener seal member 48 and the shell-stiffener seal member 70 with respect to the longitudinal direction L.

The shell-stiffener seal member 70 may include a bracket 72, a first seal member 74, for example a first O-ring, and a second seal member 76, for example a second O-ring. The bracket 72 may define a first bracket recess 78 and a second bracket recess 80, each of the first bracket recess 78 and the second bracket recess 80 configured to receive one of the first seal member 74 and the second seal member 76. As shown in the illustrated embodiment, the first bracket recess 78 and the second bracket recess 80 are aligned with respect to the radial direction R such that when the first seal member 74 is positioned within the first bracket recess 78 and the second seal member 76 is positioned within the second bracket recess 80, the first seal member 74 and the second seal member 76 are aligned with respect to the radial direction R.

The bracket 72 may define an "H shape" and, according to one aspect of the disclosure, the bracket 72 may include a first portion 82 and a second portion 84 that cooperatively define the "H shape." As shown in the illustrated embodiment, the first portion 82 and the second portion 84 may each define a "T shape" that when coupled together form the "H shape." The shell-stiffener seal member 70 may be assembled by placing the first seal member 74 in a portion of the first bracket recess 78 that is defined by the first portion 82, by placing the second seal member 76 in a portion of the second bracket recess 80 that is defined by the first portion 82, and then coupling the first portion 82 and the second portion 84. Coupling the first portion 82 and the second portion 84 may include, as one example, sonic welding.

Referring to FIG. 5, another embodiment of the shell-stiffener seal member 70 includes a bracket 172 that does not define an "H shape." As shown in the illustrated embodiment, the bracket 172 may define a ring shape with a surface 176 that faces in the longitudinal direction L.

Referring again to FIGS. 1 to 4, the pipe fitting 20 defines an assembled configuration in which the shell-stiffener seal member 70 is positioned both between the first end 42 of the stiffener 28 and the gripping ring 60 with respect to the longitudinal direction L and in the pocket 47. In the assembled configuration the first seal member 74 is compressed and forms a seal between the bracket 72 and the shell inner surface 34 and the second seal member 76 is compressed and forms a seal between the bracket 72 and the stiffener outer surface 36, thereby forming a seal within the pocket 47 between the shell inner surface 34 and the stiffener outer surface 36.

The stiffener 28, according to one embodiment, may include a first portion 49 and a second portion 51, the second portion 51 spaced from the first portion 49 such that the stiffener recess 46 is between the first portion 49 and the second portion 51 with respect to the longitudinal direction L. The stiffener 28 may include a first outer diameter D1 defined by the stiffener outer surface 36 measured at a location 53 in the first portion 49 that is contacted by the second seal member 76. The stiffener 28 may further include a second outer diameter D2 that is defined by the stiffener outer surface 36 measured at a location 55 in the second portion 51. As shown in the illustrated embodiment, the first outer diameter D1 may be equal to the second outer diameter D2.

As shown in the illustrated embodiment, the shell-stiffener seal member 70 is not confined within a channel that prevents movement of the shell-stiffener seal member 70 relative to the shell 26, the stiffener 28, or both along the longitudinal direction L. Thus, according to one aspect of the disclosure in the assembled configuration the shell-stiffener seal member 70 is translatable relative to the shell 26, the stiffener 28, or both along the longitudinal direction L.

The pipe fitting 20 is configured to be coupled to the pipe 10 to define a coupled configuration. In the coupled configuration the stiffener 28 is positioned within the pipe through bore 14 such that the stiffener seal member 48 is compressed between and forms a seal between the stiffener outer surface 36 and the pipe inner surface 19, a portion of the pipe 10 is positioned in the pocket 47 such that the stiffener seal member 48 is compressed between and forms a seal between the shell inner surface 34 and the pipe outer surface 18, and the shell-stiffener seal member 70 is compressed between and forms a seal between the shell inner surface 34 and the stiffener outer surface 36.

According to one embodiment, the bracket 72 may be stiffer than at least one of the first seal member 74 and the second seal member 76. For example the shell-stiffener seal member 70 may be configured such that an amount of force that, if applied to the first seal member 74 would deform the first seal member 74 would not deform the bracket 72. The shell-stiffener seal member 70 with the bracket 72 as described above may improve the process of coupling the pipe fitting 20 to the pipe 10. For example, an end 15 of the pipe 10 may be chamfered prior to insertion of the pipe 10 into the pocket 47. The bracket 72 is configured to receive an impact of the chamfered end 15 without deformation or damage.

If the chamfered end 15 damages the shell-stiffener seal member 70, there might not be an adequate seal created between the shell 26 and the stiffener 28. If the chamfered end 15 deforms the shell-stiffener seal member 70, the pipe 10 may not be inserted to the correct depth. Inserting the pipe 10 to the correct depth within the pocket 47 may be important to form an effective seal. For example, the correct depth may be determined based on location of scratches or defects on the pipe outer surface 18, and ensuring that the shell seal member 68 is not aligned with the scratches or defects. An installer of the pipe fitting 20 may mark the outer pipe surface 18 at a location that is aligned with the shell second end 31 when the pipe 10 is inserted within the pocket 4 to the correct depth. Thus, the shell-stiffener seal member 70 including the bracket 72 positioned such that the chamfered end 15 does not impact either of the first seal member 74 or the second seal member 76 may result in a more efficient coupling process and a more effective seal for the pipe 10 and the pipe fitting 20.

The inclusion of the shell-stiffener seal member 70 removes the problem of damage, such as scratches, on the pipe outer surface 18 preventing an adequate seal being formed between the shell inner surface 34 and the pipe outer surface 18. The shell-stiffener seal member 70 forms a seal independent of the pipe 10, therefore rendering any damage to the pipe outer surface 18 moot to the formation of an adequate seal. Additionally, the radial alignment of the first seal member 74 and the second seal member 76 may result in an effective seal between the shell 26 and the stiffener 28 that is more resilient and resistant to damage and leaks as a result of bending loads or other forces applied to the coupled pipe 10 than a seal member without a radially aligned plurality of seal members, for example a single seal member such as an O-ring.

Referring to FIG. 5, in the assembled configuration the shell-stiffener seal member 174 is compressed and forms a seal between the shell inner surface 34 and the stiffener outer surface 36. The bracket 172 may be positioned relative to the shell-stiffener seal member 174 and stiffer than the shell-stiffener seal member 174 similarly to the bracket 72 and first and second seal members 74 and 76 as described above.

Referring again to FIGS. 1 to 4, when the pipe 10 and the pipe fitting 20 are in the coupled configuration attempted withdrawal of the pipe 10 from the pocket 47 in the longitudinal direction L causes the teeth 66, which are directly abutting the pipe outer surface 18 to move the gripping assembly 50 in the longitudinal direction L, which results in the pipe 10 being more firmly gripped by the gripping collet 52 as described below.

As the gripping assembly 50 moves relative to the shell 26 in the longitudinal direction L, the tapered outer surface 54 of the gripping assembly abuts and is compressed radially toward the axis 24 by a tapered portion of the shell inner surface 34. The radial compression results in the gripping collet 52 exerting a gripping force on the pipe 10 thereby preventing further movement of the pipe 10 relative to the gripping assembly 50 in the longitudinal direction L.

The shell first end 29 may be configured to be coupled to a plurality of other members of fittings including but not limited to: a valve, a plug, and another pipe fitting. Referring to FIGS. 6 and 7, a pipe fitting 120 may include two identical ones of the pipe fitting 20 coupled to one another. As shown in the illustrated embodiment, the pipe fitting 120 includes a first pipe fitting 20a coupled to a second pipe fitting 20b, for example by connecting the shell first ends 29 of the first pipe fitting 20a and the second pipe fitting 20b. The description of the pipe fitting 20 herein is applicable to each of the first pipe fitting 20a and the second pipe fitting 20b. According to one embodiment, the first ends 29 may be connected by placing a hot member in contact with each of the first ends 29 until each of the first ends 29 begins to melt, then removing the hot member and forcing the first ends 29 into direct contact such that as the first ends 29 cool, the first ends solidify into a single piece thereby forming the pipe fitting 120.

The pipe fitting 120 is configured to couple a first pipe 10a to a second pipe 10b. As shown in the illustrated embodiment, the first pipe fitting 20a is coupled to the first pipe 10a to form a coupled configuration as described above, and the second pipe fitting 20b is coupled to the second pipe 10b to form a coupled configuration as described above. The resulting coupled configuration allows the substance to flow through the first pipe 10a, through the pipe fitting 120, and through the second pipe 10b without leaking any of the substance into the surrounding environment.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present disclosure.

I claim:

1. A pipe fitting configured to be coupled to a pipe, the pipe fitting comprising:
a body that is elongate along a central axis that extends in a longitudinal direction, the body including:
a shell and a shell through hole that extends through the shell in the longitudinal direction, the shell having a shell inner surface that defines the shell through hole;
a stiffener positioned within the shell through hole, the stiffener including a shell outer surface that faces the shell inner surface such that the stiffener outer surface and the shell inner surface cooperate to define a pocket configured to receive the pipe; and
a shell-stiffener seal member including a bracket, a first seal member, and a second seal member, the shell-stiffener positioned in the pocket such that: 1) the first seal member is compressed and forms a seal between the bracket and the shell inner surface, 2) the second seal member is compressed and forms a seal between the bracket and the stiffener outer surface, and 3) the first seal member and the second seal member are aligned in a radial direction, which is perpendicular to the longitudinal direction, wherein the stiffener outer surface defines a stiffener recess that receives a stiffener seal member, the stiffener seal member is configured to compress and form a seal between an inner surface of the pipe and the stiffener outer surface when the pipe is positioned in the pocket, wherein the stiffener includes a first portion and a second portion, the second portion spaced from the first portion such that the stiffener recess is between the first portion and the second portion with respect to the longitudinal direction, the stiffener has a first outer diameter defined by the stiffener outer surface measured at a location in the first portion that is contacted by the second seal member, the stiffener has a second outer diameter that is defined by the stiffener outer surface measured at a location in the second portion, and the first outer diameter is equal to the second outer diameter; and
further comprising a shell seal member configured to compress and form a seal between the shell inner surface and an outer surface of the pipe when the pipe is positioned in the pocket.

2. The pipe fitting of claim 1, wherein the bracket defines a first bracket recess configured to receive the first seal member, the bracket defines a second bracket recess configured to receive the second seal member, and the first bracket recess is aligned with the second bracket recess in the radial direction.

3. The pipe fitting of claim 2, wherein the bracket is substantially H shaped.

4. The pipe fitting of claim 2, wherein the bracket includes a first portion and a second portion, the first portion defines a first portion of both the first bracket recess and the second bracket recess, the second portion defines a second portion of both the first bracket recess and the second bracket recess, and the first portion and the second portion are configured to be coupled together such that the first portion and the second portion cooperatively define both the first bracket recess and the second bracket recess.

5. The pipe fitting of claim 4, wherein at least one of the first portion and the second portion is substantially T shaped.

6. The pipe fitting of claim 1, further comprising a gripping assembly configured to restrict relative movement of the pipe and the pipe fitting along the longitudinal direction when the pipe is positioned in the pocket and coupled to the pipe fitting.

7. The pipe fitting of claim 1, wherein at least one of the first seal member and the second seal member includes an O-ring.

8. A pipe fitting configured to be coupled to a pipe, the pipe fitting comprising:
   a body that is elongate along a central axis that extends in a longitudinal direction, the body including:
   a shell and a shell through hole that extends through the shell in the longitudinal direction, the shell having a shell inner surface that defines the shell through hole;
   a stiffener positioned within the shell through hole, the stiffener including a stiffener outer surface that faces the shell inner surface such that the stiffener outer surface and the shell inner surface cooperate to define a pocket configured to receive the pipe, the stiffener outer surface defining a stiffener recess configured to receive a stiffener seal member that is configured to compress and form a seal between an inner surface of the pipe and the stiffener outer surface when the pipe is positioned in the pocket, the stiffener including a first portion and a second portion, the second portion spaced from the first portion such that the stiffener recess is between the first portion and the second portion with respect to the longitudinal direction; and
   a shell-stiffener seal member that is compressed and forms a seal between the shell inner surface and the stiffener outer surface wherein the shell-stiffener seal member includes a bracket, a first seal member, and a second seal member, the shell-stiffener positioned in the pocket such that: 1) the first seal member is compressed and forms a seal between the bracket and the shell inner surface, 2) the second seal member is compressed and forms a seal between the bracket and the stiffener outer surface, and 3) the first seal member and the second seal member are aligned in a radial direction, which is perpendicular to the longitudinal direction, and the bracket defines a first bracket recess configured to receive the first seal member, the bracket defines a second bracket recess configured to receive the second seal member, and the first bracket recess is aligned with the second bracket recess in the radial direction,
   wherein the stiffener has a first outer diameter defined by the stiffener outer surface measured at a location in the first portion that is contacted by the shell-stiffener seal member, the stiffener has a second outer diameter that is defined by the stiffener outer surface measured at a location in the second portion, and the first outer diameter is equal to the second outer diameter.

9. The pipe fitting of claim 8, wherein the bracket is substantially H shaped.

10. The pipe fitting of claim 8, wherein at least one of the first seal member and the second seal member includes an O-ring.

11. The pipe fitting of claim 8, wherein the bracket includes a first portion and a second portion, the first portion defines a first portion of both the first bracket recess and the second bracket recess, the second portion defines a second portion of both the first bracket recess and the second bracket recess, and the first portion and the second portion are configured to be coupled together such that the first portion and the second portion cooperatively define both the first bracket recess and the second bracket recess.

12. The pipe fitting of claim 11, wherein at least one of the first portion and the second portion is substantially T shaped.

* * * * *